US006378433B1

(12) United States Patent
Cacchi

(10) Patent No.: US 6,378,433 B1
(45) Date of Patent: Apr. 30, 2002

(54) METHOD FOR MOUNTING PRINTING PLATES ON SLEEVES AND FOR MOUNTING THE RESULTANT SLEEVES ON FLEXOGRAPHIC PRINTING MACHINE CYLINDERS

(76) Inventor: Gabriella Cacchi, Piazza Teatro 23, I-96012 Avola (IT)

(*) Notice: Subject to any disclaimer, the term of this patent is extended or adjusted under 35 U.S.C. 154(b) by 0 days.

(21) Appl. No.: 09/463,859

(22) PCT Filed: Jul. 16, 1998

(86) PCT No.: PCT/EP98/04448

§ 371 Date: Jan. 28, 2000

§ 102(e) Date: Jan. 28, 2000

(87) PCT Pub. No.: WO99/06212

PCT Pub. Date: Feb. 11, 1999

(30) Foreign Application Priority Data

Jul. 29, 1997 (IT) ........................................ MI97A1814

(51) Int. Cl.[7] ............................ B41F 1/34; B23B 39/00
(52) U.S. Cl. ............... 101/483; 101/129; 101/DIG. 36; 101/401.1; 33/621
(58) Field of Search ............................. 101/415.1, 216, 101/227.1, 229, DIG. 36, 483, 481, 486, 493; 33/620, 621

(56) References Cited

U.S. PATENT DOCUMENTS

| | | | | | |
|---|---|---|---|---|---|
| 2,984,910 | A | * | 5/1961 | La Cour | 101/401.1 |
| 3,128,700 | A | * | 4/1964 | Kunetka | |
| 3,210,187 | A | * | 10/1965 | Thommes | |
| 4,226,181 | A | * | 10/1980 | Ericsson | 101/129 |
| 4,446,625 | A | * | 5/1984 | Hagan et al. | 33/621 |
| 4,516,495 | A | * | 5/1985 | Ericsson | 101/129 |
| 4,871,631 | A | * | 10/1989 | Pieper et al. | |
| 4,872,407 | A | * | 10/1989 | Banke | 101/DIG. 36 |
| 4,925,506 | A | * | 5/1990 | Baker | 156/64 |
| 5,031,334 | A | * | 7/1991 | Takamura | 101/DIG. 36 |
| 5,462,836 | A | * | 10/1995 | Hornschuh | 101/DIG. 36 |
| 5,504,999 | A | * | 4/1996 | Barr | 33/621 |
| 5,676,058 | A | * | 10/1997 | Treton | 101/DIG. 36 |

FOREIGN PATENT DOCUMENTS

| | | | | |
|---|---|---|---|---|
| EP | 026-4894 A | * | 4/1988 | |
| EP | 0-766143 A | * | 4/1997 | |
| GB | 0700133 | * | 11/1953 | 101/DIG. 36 |
| GB | 1018686 | * | 2/1966 | 101/DIG. 36 |
| JP | 0038294 | * | 2/1989 | 101/DIG. 36 |
| WO | 95-19267 A | * | 7/1995 | |
| WO | 95/19267 | * | 7/1995 | |

* cited by examiner

*Primary Examiner*—Eugene Eickholt
(74) *Attorney, Agent, or Firm*—Steinberg & Raskin, P.C.

(57) ABSTRACT

A method for mounting printing plates to a printing cylinder including the steps of first securing the plates to a flexible transparent polymer film sleeve and then securing the sleeve to the printing cylinder.

11 Claims, 1 Drawing Sheet

METHOD FOR MOUNTING PRINTING PLATES ON SLEEVES AND FOR MOUNTING THE RESULTANT SLEEVES ON FLEXOGRAPHIC PRINTING MACHINE CYLINDERS

FIELD OF THE INVENTION

This invention relates to a method for mounting printing plates of substantially transparent polymer on the plate cylinders of flexographic printing machines.

BACKGROUND OF THE INVENTION

As is well known to one skilled in the art, when a flexographic printing machine is to be used to print writing, markings or designs on a polymer strip which are to be repeated along the strip, various operations are required, and in particular:

- the polymer printing plates must be prepared and their completeness checked by comparison with the sample or sketch;
- the various plates must be mounted on the relative flexographic machine cylinders (one per colour), this mounting being achieved by double-adhesive tape of a width sufficient to cover a whole plate or a group of plates;
- the plate cylinders must be mounted on the relative flexographic printing machine;
- the various colours must be centered and the printing pressures adjusted to obtain exact position of all the colours;
- the printing machine must then be started to achieve the required production.

The polymer printing plates can be prepared and mounted on the plate cylinders either manually or by means of appropriate devices known as "plate assemblers", for example of the electronic or so-called "point" type. However the operations involved in mounting the plates on their cylinders are extremely repetitive, whether they are mounted manually or by means of plate assemblers. In addition, each time a given client's order is to be repeated, even if the printing has the same pitch as that underway, the plate cylinders have to be removed from the printing machine, the plates have to be mounted on the various cylinders and, when the production batch is complete, the plates have to be removed from the cylinders and be returned to store to remain there until the next order. As will be apparent, said operations are complicated, lengthy, repetitive and significantly affect the production cost.

Moreover the current market tendency (based on the "just in time" concept) is to reduce the volume of an individual production batch and increase the order frequency, to consequently increase the number of times a certain production has to be repeated. At each production repeat, it is necessary in practice to replace the said double-adhesive tape by which the plates are applied to the cylinders, this tape being of considerable width and of consequent high cost per unit area.

In removing the polymer plates from the relative cylinders to store them until their next use, it not infrequently happens that the plates stretch and deform or even tear, with consequent involvement of cost for their replacement.

Furthermore, as is well known to the expert of the art, each time the plates are applied to the cylinders there is a very high risk of error consequent on forgetfulness (one or more plates are not mounted) or on inaccurate measurement of the printing pitch.

When the production batch is complete the cylinders have to be changed on the printing machine, with consequent machine down-time required to;

a) halt the machine;

b) withdraw the plate cylinder from the relative impression cylinder, this operation being required for each colour;

c) remove the caps from the pivots of the relative plate cylinder;

d) manually or automatically remove each plate cylinder from the printing machine;

e) arrange the plate cylinders on appropriate supports in a parking region provided for this purpose;

f) remove the plates applied to the cylinders and mount on the relative cylinders the plates of the new batch to be worked;

g) manually or automatically pick up the cylinders to which the new plates have been applied and transport them to the printing machine;

h) mount the plate cylinders on the printing machine;

i) centre the various colours and set the pressures;

j) restart the machine.

From the aforegoing it is apparent that the aforedescribed operations are substantially repetitive. It should however be noted that some of these operations are also dangerous for the operator (in particular the removal, transport and remounting of plate cylinders).

In any event the relative machine stoppage significantly affects production cost, even if this cost cannot be easily quantified precisely. However, to give an idea, reference will be made to a batch of about 2000 kg of polyethylene film of width 100 centimetres and thickness 50 microns printed with six colours. It is printed at a rate of about 120 metres per minute, with a resultant production time normally of about 6 hours, also taking account of possible machine down-times. The time required for changing the work, on the assumption that the new work also requires six colours, is 70–80 minutes, representing a certainly not negligible percentage of the overall batch production time.

OBJECTS AND SUMMARY OF THE INVENTION

An object of this invention is to provide a method for mounting printing plates on the relative cylinders of flexographic printing machines which enables the plant down-time involved in mounting or changing the plates to be substantially reduced.

A further object is to provide a plate mounting method which substantially reduces operator danger.

A further object of the invention is to provide a method of the aforesaid type which drastically reduces the possibility of error in applying the plates to the cylinders.

Said objects are attained according to this invention by a plate mounting method comprising the following stages:

- applying those plates relative to a certain colour to a sleeve formed from a flexible transparent polymer film which is substantially indeformable in the plane of the film, ie which cannot be elongated on any side, this sleeve constituting the development of all or part of the surface of the relative plate cylinder; and
- applying the sleeve to the relative cylinder.

BRIEF DESCRIPTION OF THE DRAWINGS

The invention will be explained in more detail with reference to the following drawings in which.

DETAILED DESCRIPTION OF THE INVENTION

Figures 1, 2, 3:
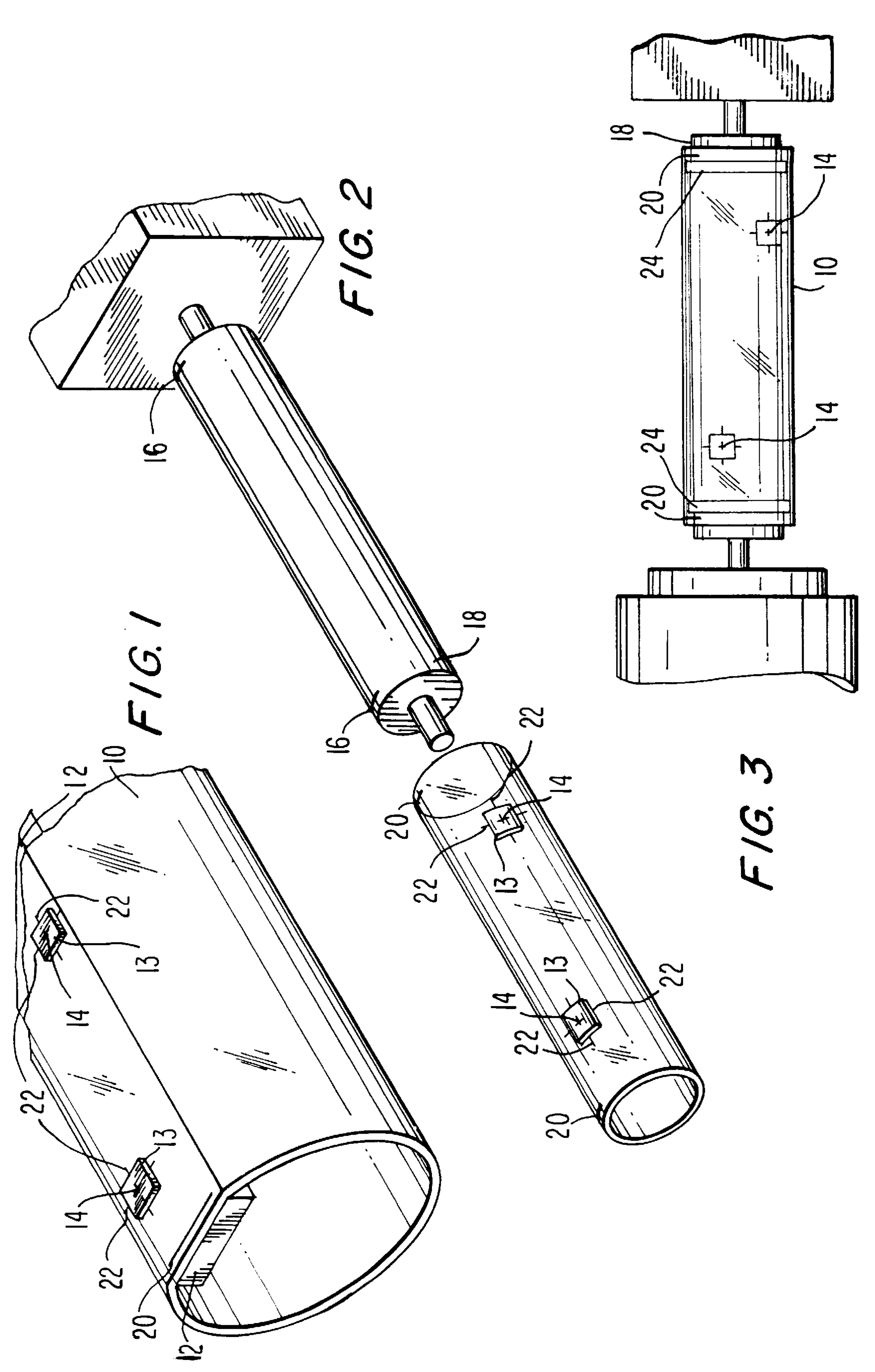
FIG. 1 is schematic drawing showing the application of the plates to the polymer sleeve using a flat working surface.
FIG. 2 is a schematic drawing showing the application of the sleeve including the plates thereon to the plate cylinder of a printing machine.
FIG. 3 is a schematic drawing showing the sleeve positioned and secured on the plate cylinder of the printing machine.

It is noted that for purposes of clarity the method of the present invention will be described with reference to a single sleeve however it is understood that multiple sleeves may be employed in accordance with the invention. As shown in FIG. 1, according to the present invention, a sleeve 10 is prepared and laid on a flat surface 12 (preferably on a luminous millimeter-graduated drawing board). On each plate 13 two perpendicular axes 14 are formed. Thereafter reference lines 16 on said plate cylinder 18 of said printing machine are reproduced as lines 20 on the sleeve 10. Then on the sleeve 10 two perpendicular axes 22 are formed on the sleeve 10 at the position that the plates 13 are to be secured to the sleeve 10. If additional sleeves are required additional sleeves may be superimposed over the first sleeve marked in the manner described above. In this fashion the various markings may copied on to each additional sleeve. A piece of double-sided tape (not shown) is applied to the back of each of the plates and the axes 14 on the plate are aligned with the axes 22 on the sleeve and the plate is thus aligned and then secured in the proper position. Thereafter a piece(s) of double sided tape 24 are applied to the inner side of the sleeve and reference lines on the sleeve 20 are aligned with the reference lines 16 on the printing cylinder 18. In this fashion the sleeve is positioned and secured in the proper location.

To be able to apply the individual plates 13 not to the curved surface of a cylinder 18 but to said flexible polymer sleeve 10, which can be extended over a flat working surface 12, conveniently a drawing board, enables the plates to be applied in a more simple and comfortable manner for the operator, under conditions which certainly allow greater accuracy. The subsequent application of the sleeve 10 to the cylinder 18, is extremely simple if, conveniently, suitable reference markings 20 are applied to the sleeve with which to make the reference markings 16 conventionally present on plate cylinders of flexographic printing machines coincide. The sleeve can be conveniently applied to the relative cylinder 18 by previously applying strips, of double-adhesive tape to the sleeve and then utilizing the said reference markings. This requires considerably less time than that involved in applying the various plates to the cylinder, with the result of also achieving greater accuracy of application. In addition, having terminated the printing of the batch concerned, the sleeve 10 can be easily removed from the cylinder 18 and stored ready for subsequent use, because the plates 13 remain applied to it. At most, only the strips of double-adhesive tape for applying the sleeve to the relative plate cylinder will need to be replaced.

The use of said sleeves 10 enables any changes requested in the meantime by the client and involving replacement of individual plates 13 to be comfortably, easily and quickly accommodated.

It should be noted that with the traditional method, to print two orders having the same pitch (ie using the same cylinder format), all the steps involved in the above points a) to i) have to be carried out, whereas with the method of the invention the work is firstly programmed for all those production batches requiring a determined cylinder format, then after steps a) and b) the relative sleeves are changed without it being necessary to remove the plate cylinders 18 from the printing machine, but simply by removing the relative sleeve 10 from the cylinders 18 and applying the new sleeve 10 to each cylinder 18. The time saving is evident, and is truly considerable.

To give an idea, by applying the method of this invention, the machine down-time necessary for changing the sleeves 10 is reduced to 2–3 minutes per color (making a total of 12–18 minutes for six colors), against a time of about 2 hours with the traditional method requiring the removal and remounting of the cylinders 18, resulting in a truly significant cost saving.

Even if plate cylinders have to be changed because the subsequent production involves a different printing pitch, there is the significant advantage of being able to previously apply the sleeves 10 to the relative different-pitch cylinders at ground level, the cylinders hence being ready to mount on the printing machine as soon as the current batch production has ended and the relative cylinders have been removed from the printing machine, with significant time saving.

It has been found that it can be convenient to protect the squaring carried out on the sleeves 10 (which as stated can be conveniently done with a pen able to write on plastic sheets) with transparent adhesive tape, especially i n those regions in which the sleeve is h and led by the operator. This prevents the lines drawn on them on the sleeve 10 from being able to be erased with the passage of time.

Production costs are also reduced by the fact that the method of the invention requires the printing plates 13 to be mounted on the sleeves 10 only once, whereas in the traditional method they are mounted on the relative cylinder 18 each time a certain production has to be repeated.

Again, as the individual plates no longer have to be removed from relative cylinder 18, there is no longer any danger of tearing or deforming them, nor the need to change the double-adhesive tape (of very large width type) used for applying the individual plates, given that these always remain applied to the sleeve 10. At most, only those-strips of double-adhesive tape (of narrow width type) used to apply the sleeves to the cylinders may need to be changed.

Finally, the method of the invention results in lesser handling of the plate cylinders 18, it being no longer necessary to remove them if the next production batch has the same printing pitch, so reducing the risk to the operator.

The individual sleeves 10 conveniently consist of rectangular sheets which, as already stated, represent the development of all or part of the surface of a plate cylinder 18. In practice these sleeves 10 are spread on a drawing board 12, preferably of the luminous millimeter-graduated type, so as to be able to accurately reproduce on said sleeves 10 (for example by a pen of, the type suitable for writing on polyester) the same longitudinal and circumferential reference lines (but developed in plan) as reproduced on each plate cylinder 18 (and which in the traditional method are used as reference markings to arrange the various plates in their correct position). Then when applying the sleeve to the relative plate cylinder 18 it becomes very easy to make the reference markings 20 on the sleeve 10 coincide, with the same reference markings 16 present on the cylinder 18. However before doing this, the various plates 13 have to be applied to the sleeve 10 in the correct position relative to, said reference lines 22. This operation is made very simple and accurate for the operator by using the reference markings on the millimeter-graduated paper while positioned on the luminous surface of the drawing board 12 rather than on the curved surface of a cylinder.

Conveniently the aforesaid operations are carried out in practice in the following manner:

1) preparing a sleeve 10 of a format suitable for the format of the plate cylinder 18 to which it is to be applied, the sleeve 10 being cut from a film of polyester or other transparent material undeformable when pulled, preferably a rectangle of such dimensions as to enable the relative plates 13 to be applied to it;
2) squaring each polymer plate 13 or group of plates 13, this operation being conventional and consisting of reproducing on each plate or group of plates two perpendicular axes 14 (this operation being conveniently performed on said luminous millimeter-graduated drawing board);
3) squaring a first sleeve, consisting of reproducing on it reference lines 20 corresponding to all or part of the reference lines 16 present on the plate cylinder 18 on which the sleeve is to be applied (this operation being conveniently carried out on said luminous millimeter-graduated drawing board);
4) plate position squaring effected on the same sleeve 10 (preferably carried out on the same aforesaid luminous millimetre-graduated drawing board), consisting of reproducing on the sleeve 10, in the exact position for enabling the required printing result to be achieved, two perpendicular lines 22 corresponding to said perpendicular axes 14 reproduced on the individual plates 13 or group of plates 13 (ie the axes of the preceding point 2);
5) superimposing on the first sleeve 10 (preferably while still on the luminous millimeter-graduated drawing board) the other sleeves, one at a time, copying on each superimposed sleeve the underlying sleeve squarings of the preceding points 3 and 4 (the number of sleeves equals the number of colors to be printed);
6) applying under each plate 13 either a single piece of double adhesive tape extending across the entire plate, or strips of narrower double-adhesive tape (decidedly less costly, but having proved suitable for the purpose);
7) positioning each plate 13 or group of plates 13 on the relative sleeve 10, done by simply superimposing the drawn axes 14 of each plate (in accordance with the preceding point 2) on the plate positioning axes reproduced on the sleeve 22 (in accordance with the preceding point 4);
8) applying a double-adhesive tape (in one piece or, less costly, in strips) to the rear of each sleeve;
9) applying the sleeve 10 to the relative plate cylinder 18, by simply superimposing on the reference lines 16 present on the cylinder 18 the corresponding reference lines 20 reproduced on the sleeve 10.

What is claimed is:

1. A method of applying printing plates of substantially transparent polymer to the plate cylinders of a flexographic printing machine comprising the steps:

applying and selectively securing at least one plate to a flat rectangular sleeve formed from a flexible transparent polymer film;

applying and selectively securing the sleeve to a selected one of the plate cylinders of the flexographic printing machine.

2. The method as claimed in claim 1, further comprising:

prior to applying said plate to said sleeve forming on said plate two perpendicular axes.

3. The method as claimed in claim 1, wherein said sleeve is a rectangular sheet.

4. The method as claimed in claim 1, wherein said sleeve is polyester.

5. The method as claimed in claim 1, further comprising:

prior to applying said plate to said sleeve producing on said sleeve a set of reference markings corresponding to a set of reference markings on said relative plate cylinder.

6. The method as claimed in claim 2, further comprising:

prior to applying said plate to said sleeve producing on said sleeve two perpendicular axes corresponding to said two perpendicular axes on said plate.

7. The method as claimed in claim 1, wherein said sleeve applied to the relative cylinder by means of double sided adhesive tape.

8. The method as claimed in claim 1, wherein said plate is applied to the relative sleeve by means of double sided adhesive tape.

9. The method as claimed in claim 5, wherein said reference markings on said sleeve are drawn in said sleeve.

10. The method as claimed in claim 6, wherein said two perpendicular axes on said sleeve are drawn on said sleeve.

11. A method of applying printing plates of substantially transparent polymer to the plate cylinders of a flexographic printing machine comprising the steps:

preparing a plurality of sleeves;

squaring a plurality of plates by forming on each one of the plurality of plates two perpendicular axes;

forming on each of said sleeves reference lines which correspond to reference lines present on said plate cylinders of said flexographic printing machine;

forming on each of said sleeves two perpendicular lines corresponding to said perpendicular axes formed on a corresponding one said plurality of plates;

positioning each one of said plurality of plates on a corresponding sleeve by aligning the perpendicular axes formed on said plates with the perpendicular axes formed on said sleeve;

selectively securing each one of said plurality of plates to said corresponding sleeve;

positioning each one of said plurality of sleeves on a corresponding one of said plate cylinders of flexographic printing machine by aligning said reference lines on said sleeve with said reference lines on said corresponding cylinder;

selectively securing each one of said sleeves to said corresponding cylinder.

* * * * *